(12) United States Patent
Iwami

(10) Patent No.: US 7,137,908 B2
(45) Date of Patent: Nov. 21, 2006

(54) GOLF BALL

(75) Inventor: Satoshi Iwami, Kobe (JP)

(73) Assignee: SRI Sports Limited, Kobe (JP)

( * ) Notice: Subject to any disclaimer, the term of this patent is extended or adjusted under 35 U.S.C. 154(b) by 43 days.

(21) Appl. No.: 10/314,272

(22) Filed: Dec. 9, 2002

(65) Prior Publication Data

US 2003/0125136 A1    Jul. 3, 2003

(30) Foreign Application Priority Data

Dec. 10, 2001  (JP)  ............... 2001-375383
Dec. 18, 2001  (JP)  ............... 2001-384652

(51) Int. Cl.
A63B 37/12    (2006.01)
A63B 37/06    (2006.01)

(52) U.S. Cl. ...................... 473/378; 473/365

(58) Field of Classification Search ........ 473/361–378; 525/66, 425
See application file for complete search history.

(56) References Cited

U.S. PATENT DOCUMENTS

| | | | |
|---|---|---|---|
| 4,338,413 A * | 7/1982 | Coran et al. ................ | 525/179 |
| 4,955,966 A * | 9/1990 | Yuki et al. .................. | 473/359 |
| 5,716,293 A | 2/1998 | Yabuki et al. | |
| 5,935,021 A | 8/1999 | Kashiwagi et al. | |
| 5,971,870 A * | 10/1999 | Sullivan et al. ............. | 473/373 |
| 5,981,654 A * | 11/1999 | Rajagopalan ................ | 525/66 |

FOREIGN PATENT DOCUMENTS

| | | | |
|---|---|---|---|
| JP | 59-91973 A | | 5/1984 |
| JP | 60188437 A | * | 9/1985 |
| JP | 62-64378 A | | 3/1987 |
| JP | 63-9461 A | | 1/1988 |
| JP | 1-223980 A | | 9/1989 |
| JP | 06-319832 A | | 11/1994 |
| JP | 10-179802 A | | 7/1998 |
| JP | 10-225532 A | | 8/1998 |
| JP | 2000109606 A | * | 4/2000 |

OTHER PUBLICATIONS

Yamamoto et al., The Society of Rheology, Japan; Nihon Reoroji Gakkaishi vol. 25, No. 5, 1997, pp. 275-282.

* cited by examiner

*Primary Examiner*—Eugene Kim
*Assistant Examiner*—Alvin A. Hunter, Jr.
(74) *Attorney, Agent, or Firm*—Birch, Stewart, Kolasch & Birch, LLP

(57) ABSTRACT

A golf ball excellent in wear resistance and abrasion resistance is provided without sacrificing various characteristics such as rebound performance, spin performance, cut resistance and feeling at the time of hitting. The golf ball is formed of a core and a cover covering the core. The cover is formed by mixing 1–50 parts by mass of a ternary composite made of a rubber component, a polyolefin component and a nylon component in 100 parts by mass of at least one resin component selected from the group consisting of a polyurethane resin, a polyester resin, a polyamide resin and an olefin resin.

17 Claims, No Drawings

GOLF BALL

BACKGROUND OF THE INVENTION

1. Field of the Invention

The present invention relates to a golf ball having an improved resistance against wear and abrasion maintaining various characteristics such as bound performance, spin performance, cut resistance and feeling at the time of hitting a ball.

2. Description of the Background Art

Conventionally, a golf ball having a thread-wound layer formed at a liquid center and a balata cover covering thereof has widely been used by advanced golfers and professional golfers as being excellent in shot feel and controllability. Since such a golf ball, however, has a structure that makes the manufacturing process complicated, and is poor in the cut resistance and the resistance against wear and abrasion, a variety of golf balls excellent in these characteristics as a whole have been developed.

Japanese Patent Laying-Open No. 59-91973, for example, proposes a golf ball having a solid core having a diameter of 36.0–38 mm, formed of rubber or resin containing at least 5 wt % of a carbon fiber, a silicon carbide fiber, or a boron fiber of 0.1 mm or more in length to improve durability and feeling at the time of hitting.

Japanese Patent Laying-Open No. 62-64378 proposes a cover composition for a golf ball where a fine fiber having an amide group is blended in a cover material containing trans-polyisoprene as a main component to improve rebound property, spin property and cut resistance.

Japanese Patent Laying-Open No. 63-9461 proposes a cover composition for a golf ball where 5–42 parts by mass of trans-polybutadiene, 1–15 parts by mass of fine fiber having an amide group, and 5–30 parts by mass of natural rubber are blended in 100 parts by mass of a cover material containing trans-polyisoprene as a main component, as a cover material that realizes the best possible performance, that is, a flight distance of a multi-dimple type golf ball.

Japanese Patent Laying-Open No. 1-223980 proposes a thread-wound golf ball using a cover material where inorganic single crystal fibers are blended in a trans-1,4-polyisoprene-based cover material to improve a flight distance of the ball.

U.S. Pat. No. 5,716,293 discloses the use of a solid rubber center containing an oily material and a soft cover material to improve a shot feel and to increase a spin amount with a short iron as well. Since this technique uses an oil proof rubber or an iomoner resin having a high hardness for the outer side of the solid rubber center, the rebound performance and the shot feel is yet to be improved.

U.S. Pat. No. 5,935,021 proposes a technique to improve rebound property, durability and cut resistance by blending fibrous aluminum borate whiskers in a main material of a thermoplastic resin or a thermoplastic elastomer. This technique, however, reduces the rebound performance of the cover material by blending the aforementioned whiskers.

Japanese Patent Laying-Open No. 10-179802 proposes a golf ball where a base resin of a cover is formed of a two-component heated mixture, as a main component, of an ionomer resin and a styrene-butadiene-styrene block copolymer having a polybutadiene block containing an epoxy group or a styrene-isoprene-styrene block copolymer having polyisoprene block containing an epoxy group, characterized in that the composition forming the cover has a flexural modulus of 50–300 MPa and a Shore D hardness of 40–60. This technique is intended to improve the shot feel, the spin performance and the flight performance, but the cut resistance is still to be improved.

Japanese Patent Laying-Open No. 10-225532 proposes a cover composition for a golf ball formed of a resin composition in which aluminum borate whiskers are blended in a resin material made of an ionomer resin as a base material to improve durability.

Japanese Patent Laying-Open No. 6-319832 proposes a composition as a cover material formed by blending a core shell polymer made of (a) a core of a rubber-like polymer having an epoxy group or a carboxyl group or an acid anhydride group on the surface and (b) a shell of a glassy polymer, into an ethylene-unsaturated carboxylic acid copolymer, to improve a soft feeling and durability as well as rebound performance.

The Journal of the Society of Rheology, Japan, Vol. 25 (1997) has reported a development of a micro disperse system super-fine fiber reinforced composite prepared from a rubber-polyolefin-nylon ternary graft copolymer as an application of the plastic field.

These conventional techniques cannot improve the rebound performance, the spin performance, the cut resistance and the feeling as well as the resistance against wear and abrasion on the whole.

SUMMARY OF THE INVENTION

The present invention provides a golf ball excellent in various characteristics such as rebound performance and the resistance against abrasion and wear, which are the problems of the conventional golf balls.

The present invention provides a golf ball including a core and a cover covering the core. The cover is formed of a composition obtained by mixing a ternary composite made of a rubber component, a polyolefin component and a nylon component in a resin component.

The present invention provides a golf ball including a core and a cover covering the core. The cover is formed of a composition obtained by mixing a ternary composite made of a rubber component, a polyolefin component and a nylon component in at least one resin component selected from the group consisting of a polyurethane resin, a polyester resin and a polyamide resin. A thermoplastic elastomer is suitably selected as a resin component. The cover is preferably formed of a composition obtained by mixing 1–50 parts by mass of the ternary composite in 100 parts by mass of the resin component.

The present invention provides a golf ball including a core and a cover covering the core. The cover is formed of a composition obtained by mixing a ternary composite made of a rubber component, a polyolefin component and a nylon component in an olefin resin. An olefin thermoplastic resin, an ionomer resin, an olefin thermoplastic elastomer, or a modified product thereof is used as the olefin resin. In accordance with the present invention, the cover is preferably formed of a composition obtained by mixing 1–50 parts by mass of the ternary composite in 100 parts by mass of the olefin resin.

In the golf ball in accordance with the present invention, the cover has a Shore D hardness of 40–56.

The foregoing and other objects, features, aspects and advantages of the present invention will become more apparent from the following detailed description of the present invention.

DESCRIPTION OF THE PREFERRED EMBODIMENTS

The present invention provides a golf ball including a core and a cover covering the core. The cover is formed of a composition obtained by mixing a ternary composite made of a rubber component, a polyolefin component and a nylon component in a resin component, for example, at least one resin component selected from the group consisting of a polyurethane resin, a polyester resin, a polyamide resin, and an olefin resin.

<Resin Component>

The resin component used in the cover composition of the present invention is to be interpreted in the broadest sense. The polyurethane resin includes a polyurethane thermoplastic resin and a polyurethane thermoplastic elastomer, the polyester resin includes a polyester thermoplastic resin and a polyester thermoplastic elastomer, and the polyamide resin includes a polyamide thermoplastic resin and a polyamide thermoplastic elastomer.

The olefin resin is a polymer including an olefin as a polymeric unit, and includes, for example, an olefin thermoplastic resin, an ionomer resin, an olefin thermoplastic elastomer, or a modified product thereof.

<Polyurethane Resin>

The polyurethane resin includes a polyurethane thermoplastic elastomer and a polyurethane thermoplastic resin. The polyurethane thermoplastic elastomer is formed of a hard segment of a urethane structure and a soft segment of polyester or polyether. Listed as trade names are Miractran from Nippon Miractran Co., Ltd., Pandex from Dainippon Ink & Chemicals, Paraprene from Nippon Polyurethane Industry Co., Ltd., Pellethane from Dow Chemical Japan Limited, Elastollan from BASF Polyurethane Elastomers Ltd., Estan and Estaloc from Kyowa Hakko Kogyo, Iron Rubber from Nippon Mektron, Ltd., Resamine P from Dainichiseika C. & C. Mfg., Hi-prene from Mitsui-Nisso Urethane, Mobilon from Nisshinbo Industries, Kuramilon U from Kuraray Co., Ufine and Morthane from Asahi Glass Company, Sumiflex from Sumitomo Bakelite, ToyoboUrethane from Toyobo Co., Eagleran from Hokushin Corporation, and the like. The polyurethane thermoplastic resin broadly means a resin having a urethane bond in a molecular chain.

<Polyester Resin>

The polyester resin includes a polyester thermoplastic elastomer and a polyester thermoplastic resin. The polyester thermoplastic elastomer is formed of a hard segment of a polyester structure and a soft segment of polyether and polyester. Listed as trade names are Hytrel from Du Pont-Toray Co., Ltd., Pelprene P. S from Toyobo Co., Grilux E from Dainippon Ink & Chemicals, Lomod from GE Plastics Japan, Diaalloy R from Mitsubishi Rayon Co., Ltd., S-TPE from Sekisui Chemical Co., Ltd., ZTPE from Zeon Corp, Nubelan from Teijin Ltd., Flexsomer from Nippon Synthetic Chemical Industry Co., Ltd., Libellan from Nippon Miractran Co., Ltd., Primalloy from Mitsubishi Chemical Corporation, and the like. The polyester thermoplastic resin is a thermoplastic resin having a polyester bond in a molecule, and includes, for example, polyethylene terephthalate and the like.

<Polyamide Resin>

The polyamide resin includes a polyamide thermoplastic elastomer and a polyamide thermoplastic resin. The polyamide thermoplastic elastomer is formed of a hard segment of polyamide and a soft segment of polyether or polyester. Listed as trade names are Pebax from Toray Industries Ltd., Daiamid PAE from Daicel-Degussa Ltd., Grilux A from Dainippon Ink & Chemicals, Novamid PAE from Mitsubishi Engineering-Plastics Corporation, UBE.PAE from Ube Industries, Grilon ELX and Grilamid ELY from EMS Japan, S-TPAE from Sekisui Chemical Corporation, and the like. The polyamide thermoplastic resin is a thermoplastic resin having a polyamide bond in a molecular chain and includes nylon 6, nylon 66, nylon 11, and the like.

<Olefin Resin>

The olefin resin used in the cover composition of the present invention is a polymer including an olefin as a polymeric unit, and includes, for example, an olefin thermoplastic resin, an iomoner resin, an olefin thermoplastic elastomer, or a modified product thereof.

Polyethylene, polypropylene, polystyrene, ABS resin, acrylic resin, methacrylic resin and the like can be used as the olefin thermoplastic resin.

The ionomer resin is, for example, a binary copolymer of an $\alpha$-olefin and an $\alpha$, $\beta$-unsaturated carboxylic acid having 3–8 carbon atoms, that is produced by neutralizing at least a part of the carboxyl group with metal ion. Also listed is a ternary copolymer of an $\alpha$-olefin, an $\alpha$, $\beta$-unsaturated carboxylic acid having 3–8 carbon atoms, and an $\alpha$, $\beta$-unsaturated carboxylate having 2–22 carbon atoms, that is produced by neutralizing at least a part of the carboxyl group with metal ion.

As to the composition ratio thereof, when the ionomer resin has a base polymer of a binary copolymer of an $\alpha$-olefin and an $\alpha$, $\beta$-unsaturated carboxylic acid having 3–8 carbon atoms, it is preferable that the $\alpha$-olefin is 80–90% by weigh and the $\alpha$, $\beta$-unsaturated carboxylic acid is 10–20% by weight. When the base polymer is a ternary copolymer of an $\alpha$-olefin, an $\alpha$, $\beta$-unsaturated carboxylic acid having 3–8 carbon atoms, and an $\alpha$, $\beta$-unsaturated carboxylate having 2–22 carbon atoms, it is preferable that the $\alpha$-olefin is 70–85% by weight, the $\alpha$, $\beta$-unsaturated carboxylic acid is 5–30% by weight, and the $\alpha$, $\beta$-unsaturated carboxylate is not more than 25% by weight. These ionomer resins preferably have a melt index (MI) of 0.1–20, in particular of 0.5–15. The carboxylic acid content or the carboxylate content in the range as described above can improve the rebound property.

For example, ethylene, propylene, 1-butene, 1-pentene, or the like is used as the $\alpha$-olefin described above, and ethylene is particularly preferable. For example, acrylic acid, methacrylic acid, fumaric acid, maleic acid, crotonic acid, or the like is used as the $\alpha$, $\beta$-unsaturated carboxylic acid having 3–8 carbon atoms, and acrylic acid and methacrylic acid are particularly preferable. Acrylate, methacrylate, fumarate, maleate of methyl, ethyl, propyl, n-buthyl, isobutyl ester or the like is used as the unsaturated carboxylate, and acrylate and methacrylate are particularly preferable.

The metal ion for neutralizing at least a part of the carboxyl group in the copolymer of an $\alpha$-olefin and $\alpha$, $\beta$-unsaturated carboxylic acid, or the ternary copolymer of an $\alpha$-olefin, an $\alpha$, $\beta$-unsaturated carboxylic acid and an $\alpha$, $\beta$-unsaturated carboxylate as described above is a sodium ion, a lithium ion, a zinc ion, a magnesium ion, a potassium ion, and the like.

When the ionomer resin is obtained by neutralizing at least a part of the carboxyl group in the copolymer of ethylene and acrylic acid or methacrylic acid, a so-called high-rigidity and high-flow type one is preferable with a melt index of 3–7 and a flexural modulus of 200–400 MPa.

The specific examples of the ionomer resin as described above are the ionomer resin of binary copolymer commercially available from Du Pont-Mitsui Polychemicals Co., Ltd. under the trade names of Hi-Milan 1555 (Na), Hi-Milan 1557 (Zn), Hi-Milan 1605 (Na), Hi-Milan 1706 (Zn), Hi-Milan 1707(Na), Hi-Milan AM7318 (Na), Hi-Milan AM7315 (Zn), Hi-Milan AM7317(Zn), Hi-Milan AM7311 (Mg), and Hi-Milan MK7320 (K). The ionomer resin of ternary copolymer includes Hi-Milan 1856 (Na), Hi-Milan 1855 (Zn), Hi-Milan AM7316 (Zn), and the like.

The ionomer resin commercially available from Du Pont includes Surlyn 8945 (Na), Surlyn 8940 (Na), Surlyn 9910 (Zn), Surlyn 9945 (Zn), Surlyn 7930 (Li), and Surlyn 7940 (Li), as well as Surlyn AD8265 (Na), Surlyn AD8269 and the like as the ternary copolymer type ionomer resin.

The ionomer resin commercially available from Exxon-Mobil Chemical Company includes Iotek 7010 (Zn), Iotek 8000 (Na), and the like. It is noted that Na, Zn, K, Li, Mg, and the like shown in the brackets after the trade names described above indicate the neutralizing metal ion species thereof. In the present invention, the ionomer resin used in the cover composition may be a mixture of two or more kinds of those illustrated above, or a mixture of two or more kinds of the ionomer resins neutralized with a bivalent metal ion and the ionomer resin neutralized with a monovalent metal ion as illustrated above.

The olefin thermoplastic elastomer in the present invention is referred to as a concept including an olefin unit in a molecular chain, a so-called styrene thermoplastic elastomer, and includes a block copolymer having a soft segment and a hard segment in the molecule. The soft segment is a unit such as a butadiene block or an isoprene block derived from a conjugated diene compound. As the conjugated diene compound, for example, one or two or more kinds can be selected from butadiene, isoprene, 1,3-pentadiene, 2,3-dimethyl-1,3-butadiene, and the like, and butadiene, isoprene and the combination thereof are particularly preferable among others. The component that forms a hard segment includes a polyethylene block, a polypropylene block or a styrene block. They are derived from ethylene, propylene, styrene, and a derivative of styrene, for example, a compound formed by selecting one or two or more kinds from α-methylstyrene, vinyltoluene, p-tertiary butylstyrene and the like.

The styrene thermoplastic elastomer includes, for example, a styrene-isoprene-butadiene-styrene block copolymer (SIBS structure), a styrene-butadiene-styrene block copolymer (SBS structure), styrene-ethylene-butylene-styrene block copolymer corresponding to the hydrogenated double bonded portion of the butadiene thereof (SEBS structure), styrene-isoprene-styrene block copolymer (SIS structure), styrene-ethylene-propylene-styrene block copolymer corresponding to the hydrogenated double bonded portion of that isoprene (SEPS structure), and a modified product thereof, and the like.

It is noted that the content of styrene (or the derivative thereof) in the aforementioned SIBS structure, SBS structure, SEBS structure, SIS structure, SEPS structure, and SEEPS structure is preferably in the range of 10–50% by weight, particularly 15–45% by weight in the copolymer. If the content is less than 10% by weight, the cover tends to be soft and have a reduced cut resistance. On the other hand, if the content is more than 50% by weight, the shot feeling and controllability cannot be maintained sufficiently.

In the present invention, it is possible to use a modified product which contains a functional group selected from an epoxy group, a hydroxyl group, an acid anhydride, and a carboxyl group in a part of the polymer chain of the aforementioned SIBS structure, SBS structure, SEBS structure, SIS structure, SEPS structure, and SEEPS structure.

For example, the styrene-butadiene-styrene block copolymer (SBS structure) having a polybutadiene block containing an epoxy group is a block copolymer having polystyrene at both terminal ends with an intermediate layer of polybutadiene containing the epoxy group, wherein a portion or all of the double bond of the polybutadiene portion may be hydrogenated. The styrene-isoprene-styrene block copolymer (SIS structure) having a polyisoprene block containing an epoxy group is a block copolymer having polystyrene at both terminal ends with an intermediate layer of polyisoprene containing the epoxy group, wherein a portion or all of the double bond of the polyisoprene portion may be hydrogenated.

An epoxidized styrene thermoplastic elastomer having the epoxy group equivalent in the range of 200–3000 can be used. When such an epoxidized thermoplastic elastomer is mixed with the ionomer resin or the like, a reaction with the free carboxyl group of the ionomer resin occurs, resulting in a strong cover composition and a further improved cut resistance. If the epoxy group equivalent is less than 200, the cut resistance is not so improved. On the other hand, if the epoxy group equivalent is more than 3000, the reaction between the epoxy group and the free carboxyl group in the ionomer resin becomes excessive, resulting in a poorer flowability, which makes the ball molding difficult. The hydroxyl group, the acid anhydride and the carboxyl group are also introduced in the intermediate portion or the terminal end of the molecular chain of the block copolymer described above.

<Mixture of Two or More Resin Components>

Two or more kinds of the resin components can be mixed for use in the cover in the present invention. For example, a polyurethane resin, a polyester resin, a polyamide resin can be mixed with an olefin resin, for example, an ionomer resin, an olefin thermoplastic resin and/or an olefin thermoplastic elastomer (including a styrene elastomer). In this case, as a mixing ratio, the olefin resin is not more than 50% by weight or 20% by weight with respect to the entire resin component.

If the olefin-resin is used alone, two or more kinds of olefin resins can be mixed for use. For example, the olefin thermoplastic elastomer can be mixed with the olefin thermoplastic resin or the ionomer resin. If not more than 50 parts by mass of olefin thermoplastic elastomer is mixed with respect to 100 parts by mass of resin component, for example, the spin performance can be maintained at a high level.

Furthermore, if the olefin thermoplastic elastomer is mixed with the ionomer resin, the cover composition attains an adequate rigidity, thereby resulting in a good shot feeling. If the ionomer resin is mixed with a functional group containing styrene thermoplastic elastomer, the reaction or interaction of the carboxyl group of the ionomer resin with the aforementioned functional group and the like can improve the cut resistance while maintaining the rebound performance of the cover composition. The mixture ratio between the ionomer resin (A component) and the olefin thermoplastic elastomer (B component) (B component/A component) should be in the range of 5/95–50/50 by weight.

<Ternary Composite>

The ternary composite used in the present invention is formed of three components of a rubber component, a polyolefin component and a nylon component. These three components are chemically bound with each other to form a composite material where the fine nylon component is evenly distributed in a matrix of the rubber component and the polyolefin component.

The rubber component is limited to those which does not undergo gelation at a high temperature at the time of kneading and reaction with nylon and spinning, such as natural rubber, polyisoprene, ethylene-propylene-diene rubber (EPDM), nitrile-butadiene rubber (NBR), hydrogenated NBR (H-NBR). Ethylene-propylene-diene rubber (EPDM) is particularly suitable.

A low-density polyethylene, a high-density polyethylene, polypropylene is used as the polyolefin component, and polypropylene is particularly preferable.

Nylon 6, nylon 66, nylon 11, nylon 12 is used as the nylon component. Nylon 6 is particularly preferable. The ratio of these combined components may be adjusted as appropriate depending on the required characteristics of the golf ball cover material. This ternary composite is developed by Ube Industries, is known under the trade name of SHP sold by Daiwa Polymer, and has the following grades according to the composition ratio:

PA3060:
  EPDM/PP/nylon 6=100/100/100;
HA1060:
  NR/HDPE/nylon 6=100/75/87;
LA1060:
  NR/LDPE/nylon 6=100/75/87;
LA3080:
  EPDM/LDPE/nylon 6=100/40/105;
LA5060:
  H-NBR/LPDE/nylon 6=100/100/100; and
Z040NB:
  NBR/LPDE/nylon 6=100/75/75 where NR is natural rubber, HDPE is a high-density polyethylene, LDPE is a low-density polyethylene, NBR is acrylonitrile-butadiene rubber, and H-NBR is a hydrogenated NBR. The composition ratio is expressed by parts by mass.

It is noted that the average diameter of the nylon fiber used in the ternary composite is normally not more than 10 μm and preferably in the range of 0.05–1 μm. In the matrix of the ternary composite, the polyolefin component (for example HDPE) forms a continuous phase.

The ternary composite (for example SHP) is normally manufactured in the following three steps:

(1) kneading and reaction of the rubber component and the polyolefin component;
(2) kneading and reaction of the rubber component, the polyolefin component and nylon; and
(3) spinning.

First of all, the rubber, the polyolefin and a reaction agent are introduced in a closed kneader to obtain a kneading and reaction product. Here a sea-island structure is formed where the polyolefin is the sea and the rubber is the island. This kneading and reaction product as well as the nylon are fed into a twin-shaft extruder with a reaction agent to obtain a ternary graft polymer of rubber-polyolefin-nylon, that is, a ternary composite. By adjusting a graft rate, the nylon is evenly distributed in the rubber-polyolefin matrix, for example, as particles of 2–3 μm.

Thereafter the product is extruded from a nozzle installed at the end of the twin-shaft extruder and drawn with draft. Through this spinning step, the nylon particles in the extruded product strand are deformed and converted into a fiber-like product. The nylon fiber diameter is normally controlled in the range of 0.2–0.3 μm, in consideration of the productivity, depending on a draft ratio. Since the polyolefin phase forms the sea in these steps, the viscosity is reduced to enable pelletization.

It is noted that the ternary composite used in the present invention is manufactured based on the description in the Journal of the Rheology Society, Japan, Vol. 25 (1997) pp. 275–282, where the composition can be further adjusted.

<Mixture of Resin Component and Ternary Composite>

In accordance with the present invention, the blended amount of the ternary composite is in the range of 1–50 parts by mass with respect to 100parts by mass of the resin component described above. Preferably, it is 5–40parts by mass, in particular 10–30 parts by mass. In this case, the content of nylon short fiber included in the ternary composite affects the reinforcing effect of the resin composition. If the blended amount of the ternary composite is less than one part by mass, the nylon short fiber has a less reinforcing effect. If the blended amount exceeds 50 parts by mass, the hardness of the cover composition is increased and the elastic modulus is reduced.

<Organic Short Fiber>

An organic short fiber, for example, a nylon fiber, an acrylic fiber, a polyester fiber, an aramid fiber, or the like can be used in the cover composition of the present invention, though not essential. In this case, the cut resistance can be improved without reducing the rebound performance.

The organic short fiber has a length in the range of 5–1000 μm, preferably 10–500 μm, and a diameter in the range of 0.05–5 μm, preferably 0.1–1 μm. If the length of the organic short fiber does not satisfy the aforementioned range, the strength is not increased because of weakness in a flexural direction and the cut resistance cannot be improved. If the diameter of the organic short fiber does not satisfy the aforementioned range, it merely acts as a filler. On the other hand, if the length and diameter of the organic short fiber exceeds the aforementioned range, the cover material is increased in viscosity and deteriorated in moldability. It is noted that the organic short fiber described above is referred to as a concept including a fiber that is finely cut into pulp.

The blended amount of the organic short fiber is in the range of 0.5–20parts by mass with respect to 100 parts by mass of the resin component. If less than 0.5 part by mass, the effect resulting from the blended organic short fiber is reduced. If more than 20 parts by mass, the cover composition is increased in viscosity and deteriorated in moldability, and is susceptible to breakage. It is noted that if a short fiber-reinforced rubber is used, the rubber is included in the polymer component and the blended amount of the organic short fiber is set in the aforementioned range.

<Other Blended Agent>

The cover composition described above may be blended with a filler such as barium sulfate, a pigment such as titanium dioxide, a dispersant, an antioxidant, a ultraviolet absorber, a photo-stabilizer, a fluorescent material or a fluorescent brightening agent, and the like, as necessary, in such a range that cannot impair the desired characteristics of the golf ball cover.

<Hardness of Cover>

The cover in the present invention has a Shore D hardness of 40–56, preferably 42–50, which is measured using a slab test piece. The Shore D hardness of less than 40 results in an excessive softness and a poor cut resistance. On the contrary, the Shore D hardness of more than 56 results in a too hard shot feeling and reduces a spin amount at the time of hitting a ball. Here a Shore D hardness is determined according to ASTMD-2240.

<Method of Manufacturing Cover Composition>

The cover composition in the present invention is formed by applying a resin component, for example, a polyurethane resin, a polyester resin, a polyamide resin, or an olefin resin and the ternary composite described above (for example SHP) into a closed kneader for kneading. At that point, a kneading temperature has to be lower than a melting point of the nylon component in the ternary composite. If the temperature is higher than the melting point of the nylon component, the fiber is melted and the reinforcement by the fiber is lost. If the kneading temperature is lower than the temperature of the polyolefin component of the ternary composite, however, the ternary composite is not distributed in the rubber composition and remains pellets. During this kneading, a phase transition of the polyolefin component and the rubber component takes place in the matrix, and the polyolefin component is finely distributed in the rubber component. The other blended agent is thereafter added and mixed, resulting in a cover composition.

<Formulation of Core>

The golf ball core in accordance with the present invention is formed of a cross-linked product of a rubber composition, where the rubber component of the rubber composition is suitably a butadiene rubber with cis-1,4-structure as a base material. It is noted that other than the aforementioned butadiene rubber, for example, natural rubber, styrene-butadiene rubber, isoprene rubber, chloroprene rubber, butyl rubber, ethylene-propylene rubber, ethylene-propylene-diene rubber, acrylicnitrile rubber may be blended by not more than 40 parts by mass with respect to 100 parts by mass of the rubber component.

In the rubber composition described above, a metallic salt of α, β-ethylene unsaturated carboxylic acid produced by reacting the α, β-ethylene unsaturated carboxylic acid such as acrylic acid or methacrylic acid with a metal oxide in the preparation of the rubber composition, or a metallic salt of the α, β-ethylene unsaturated carboxylic acid such as zinc acrylate or zinc metacrylate, as well as a multi-functional monomer, N,N'-phenylbismaleimide, sulfur, and the like may be used as a cross-linking agent. Particularly, the metallic salt of the α, β-ethylene unsaturated carboxylic acid is suitably used.

If the metallic salt of the α, β-ethylene unsaturated carboxylic acid is used, for example, the blended amount thereof is preferably 20–40 parts by mass with respect to 100 parts by mass of the rubber component. On the other hand, if the α, β-ethylene unsaturated carboxylic acid is reacted with a metal oxide during the preparation of the rubber composition, the blended amount is preferably 15–30 parts by mass of α, β-ethylene unsaturated carboxylic acid and 15–35 parts by mass of the metal oxide such as zinc oxide with respect to the α, β-ethylene unsaturated carboxylic acid.

One or two or more kinds of inorganic powder of barium sulfate, calcium carbonate, clay, zinc oxide, and the like can be used as the filler used in the rubber composition described above. The blended amount of the filler is preferably in the range of 5–50 parts by mass with respect to 100parts by mass of the rubber component. In addition, for the purpose of improving workability, hardness adjustment, and the like, a softener, a liquid rubber, and the like may be blended as appropriate. An antioxidant may be blended as appropriate.

An organic peroxide, for example, dicumyl peroxide, 1,1-bis(t-butyl peroxy)3,3,5-trimethylcyclohexane or the like is used as a cross-linking initiator. The blended amount of the cross-linking initiator is preferably 0.1–5 parts by mass, particularly 0.3–3 parts by mass with respect to 100parts by mass of the rubber component.

In accordance with the present invention, the core as described above may be of a single layer or of a multi-layer having different characteristics such as specific gravity and hardness. In this case, the formulation of the core is not limited to the formulation as described above.

<Compression Deformation Amount of Core>

The core of the present invention has the amount of compression deformation in the range of preferably 2.0–5.0 mm, particularly 2.5 mm–4.0 mm under a load of 10 kg to 130 kg. If less than 2.0 mm, the shot feel tends to be deteriorated. On the other hand, if more than 5.0, the rebound property is adversely effected.

<Method of Manufacturing Core>

In manufacturing the core, the blended agents as described above are mixed using a roll, a kneader, a Banbury, and the like and subjected to vulcanization using a mold under pressure at 145° C.–200° C., preferably at 150° C.–175° C. for 10–40 minutes. In order to attain a close contact with the cover, an adhesive may be applied to the surface of the resulting core, or the surface is processed to be coarse.

The diameter of a thread-wound core or a solid core is designed in the range of 36.8–41.4 mm, preferably 37.8–40.8 mm. If less than 36.8 mm, the thickness of the cover layer is increased and the rebound property is reduced. On the other hand, if more than 41.4 mm, the thickness of the cover layer is reduced and the molding becomes difficult.

<Method of Manufacturing Golf Ball>

In accordance with the present invention, the cover can be molded to a core using a known method. The cover composition is formed into a semi-spherical half-shell in advance and the core is wrapped with two half-shells for pressure molding at 130–170° C. for 1–5 minutes. Alternatively, the cover composition described above may be injection-molded directly onto the core to wrap the core. The thickness of the cover is 0.7–3.0 mm, preferably 1.0–2.5 mm. If less than 0.7 mm, the cover is likely to crack when hit repeatedly. If more than 3.0 mm, the shot feeling becomes worse. Furthermore, at the time of molding the cover, a number of dimples are formed on the surface as necessary. The golf ball of the present invention is normally finished with paint, stamped with marking, etc. in order to improve the appearance to increase a market value for introduction in the market.

<Structure, Size and Deformation Amount of Ball>

The golf ball of the present invention uses a thread-wound core, a single-layered or multi-layered solid core, and may be employed in either a thread-wound ball or a solid ball.

It is noted that in accordance with the present invention, the cover may be of a single layer or of a plurality of layers. The golf ball in accordance with the present invention is normally designed to have a diameter in the range of 42.67–43.00 mm and a mass in the range of 45.00–45.93 g.

The golf ball in accordance with the present invention has a compression deformation amount in the range of 2.0 mm–4.0 mm, preferably 2.5 mm–3.5 mm under a load of 10 kg to 130 kg. If less than 2.0mm, the shot feeling tends to be worse. On the other hand if more than 4.0mm, the feeling at the time of hitting becomes soft and in addition the rebound property is adversely effected.

EXAMPLE

Examples 1–6 and Comparative Examples 1–3

(1) Fabricating a Core

As shown in Table 1, the core rubber composition using butadiene rubber as a base component was kneaded and hot-molded in a mold at 170° C. for 15 minutes for fabricating a ball-like solid core having a diameter of 41.2 mm. The resulting solid core has physical properties as shown in Table 1.

TABLE 1

Core formulation

| core formulation | A |
|---|---|
| BR-18 ✕$_1$ | 100 |
| zinc acrylate | 33 |
| zinc oxide | 12.0 |
| diphenylsulfide ✕$_2$ | 0.5 |
| dicumyl peroxide ✕$_3$ | 1.0 |
| core diameter (mm) | 41.2 |
| vulcanization conditions | 170° C. × 15 min |
| deformation amount (mm) under a load of 10–130 kg | 2.90 |

✕$_1$ high-cis-polybutadiene produced by JSR Corporation
✕$_2$ produced by Sumitomo Seika Chemical Co., Ltd.
✕$_3$ produced by NOF Corporation (2) Preparing a Cover Composition The cover composition shown in Table 2 was mixed using a twin-shaft kneading-type extruder and extruded by the twin-shaft extruder at a cylinder temperature of 180° C. It is important that the extrusion temperature is below the melting point of the nylon component of the ternary composite. The extrusion conditions are as follows.

Screw diameter: 45 mm
Screw rotational speed: 200 rpm
Screw L/D: 35

The blended product was heated at a position of the die of the extruder at 195–205° C.

The cover composition described above was used to injection-mold a semi-spherical half-shell, and the core described above was wrapped with two half-shells, followed by hot-pressing compression mold at 150° C. in a mold. After cooling, a golf ball was removed. Thereafter, paint was applied to the surface and a golf ball having a diameter of 42.8 mm and a mass of 45.4 g was thus fabricated.

<Performance Evaluation Method>

A slab piece of the resulting cover composition was evaluated in respect of a Shore D hardness, a compression deformation amount of the core (golf ball), and the resistance against wear and abrasion of the golf ball.

(1) Shore D Hardness

The measurement was performed according to ASTM-D2240. The hot-pressing molded sheet fabricated from the cover composition having a thickness of about 2 mm was preserved at 23° C. for two weeks, and thereafter, three or more sheets were overlapped for measurement using a spring-type hardness Shore D tester.

(2) Compression Deformation Amount

The deformation amount (mm) was determined from an initial load of 10 kg to a final load of 130 kg applied to the golf ball (or solid core).

(3) Wear Resistance

The measurement was performed according to ASTM D-1044. The smaller the numerical value is, the better the wear resistance is.

(4) Abrasion Resistance

A commercially available pitching wedge was attached to a robot machine to hit the golf ball at two points with a head speed of 36 m/s once for each. The hit two points were observed and evaluated in three grades.

○: a scratch is left on the ball surface slightly enough to be ignored.

Δ: a scratch is clearly left on the ball surface and scuffing is slightly found.

X: the ball surface is considerably scratched and scuffing is obvious.

TABLE 2

Cover formulation

| | Blend No. | | | | | | | | |
|---|---|---|---|---|---|---|---|---|---|
| Blended agent | 1 | 2 | 3 | 4 | 5 | 6 | 7 | 8 | 9 |
| Elastollan ET690 ✕$_4$ | 100 | — | — | — | — | — | — | — | — |
| Elastollan XNY90A ✕$_5$ | — | 100 | 100 | 100 | — | — | 100 | — | — |
| Pepax 4033 ✕$_6$ | — | — | — | — | 100 | — | — | 100 | — |
| Hytrel4047 ✕$_7$ | — | — | — | — | — | 100 | — | — | 100 |
| SHP PA3060 ✕$_8$ | 15 | 15 | 30 | — | 15 | 15 | — | — | — |
| Epoxy group-modified PA3060 ✕$_9$ | — | — | — | 15 | — | — | — | — | — |
| Titanium oxide | 2 | 2 | 2 | 2 | 4 | 4 | 2 | 4 | 4 |
| Slab hardness (Shore D) | 43 | 44 | 47 | 44 | 42 | 42 | 42 | 42 | 42 |

✕$_4$ Elastollan ET690: polyurethane thermoplastic elastomer produced by BASF Polyurethane Elastomers Ltd.
✕$_5$ Elastollan XNY90A: polyurethane thermoplastic elastomer produced by BASF Polyurethane Elastomers Ltd.
✕$_6$ Pebax 4033: polyamide thermoplastic elastomer produced by Atofina Japan
✕$_7$ Hytrel 4047: polyester thermoplastic elastomer produced by Du Pont-Toray Co., Ltd.
✕$_8$ SHP PA3060: Daiwa Polymer, EPDM/PP/nylon 6 = 100/100/100, short fiber reinforced ternary composite formed of ternary graft copolymer
✕$_9$ epoxy group-modified PA3060: blended product of 5 phr of epoxy-modified polypropylene with respect to 100 phr of SHP PA3060

TABLE 3

|  | Example | | | | | | Comparative Example | | |
|---|---|---|---|---|---|---|---|---|---|
| G/B physical property | 1 | 2 | 3 | 4 | 5 | 6 | 1 | 2 | 3 |
| core formulation | A | A | A | A | A | A | A | A | A |
| core diameter (mm) | 41.2 | 41.2 | 41.2 | 41.2 | 41.2 | 41.2 | 41.2 | 41.2 | 41.2 |
| cover formulation | 1 | 2 | 3 | 4 | 5 | 6 | 7 | 8 | 9 |
| cover hardness (shore D) | 43 | 44 | 47 | 44 | 42 | 42 | 42 | 42 | 42 |
| cover thickness (mm) | 0.8 | 0.8 | 0.8 | 0.8 | 0.8 | 0.8 | 0.8 | 0.8 | 0.8 |
| Deformation amount (mm) at 10–130 kg | 2.85 | 2.82 | 2.76 | 2.81 | 2.87 | 2.86 | 2.87 | 2.88 | 2.86 |
| Abrasion resistance | ○ | ○ | ○ | ○ | ○ | ○ | Δ | x | x |
| wear resistance (index) | 30 | 30 | 20 | 25 | 40 | 35 | 90 | 100 | 95 |

Table 3 shows the measurement results of the golf balls in Examples 1–3 and Comparative Examples 1–3.
1–3 and Comparative Examples 1–3.

<Evaluation Result>

Comparative Examples 1–3 use a cover composition without the ternary composite blended, and any of them is considerably inferior in wear resistance and abrasion resistance.

Examples 1–4 are cover compositions produced by blending the ternary composite in the polyurethane thermoplastic elastomer. Example 5 is a cover composition produced by blending the ternary composite in the polyamide thermoplastic elastomer, and Example 6 is a cover composition produced by blending the ternary composite in the polyester thermoplastic elastomer. It is appreciated that any of these golf balls is excellent in wear resistance and abrasion resistance.

Examples 7–10 and Comparative Examples 4 and 5

The golf ball was manufactured through the fabrication of the core, the property adjustment of the cover composition, and the molding and vulcanization of the golf ball, in a manner similar to Example 1. The composition of the core is shown in Table 4 and the composition of the cover is shown in Table 5. The evaluation result of the golf ball is shown in Table 6.

TABLE 4

| Core preparation example | |
|---|---|
| core formulation | B |
| BR-18 $X_1$ | 100 |
| zinc acrylate | 33 |
| zinc oxide | 12.0 |
| diphenylsulfide $X_2$ | 0.5 |
| dicumyl peroxide $X_3$ | 1.0 |
| core diameter (mm) | 40.0 |
| vulcanization conditions | 170° C. × 15 min |
| deformation amount (mm) under a load of 10–130 kg | 2.85 |

$X_1$ high-cis-polybutadiene produced by JSR Corporation
$X_2$ produced by Sumitomo Seika Chemical Co., Ltd.
$X_3$ produced by NOF Corporation

TABLE 5

| Cover formulation | | | | | | |
|---|---|---|---|---|---|---|
| | Blend No. | | | | | |
| Blended agent | 10 | 11 | 12 | 13 | 14 | 15 |
| Hi-Milan 1605 $X_4$ | 20 | 20 | 20 | — | 20 | — |
| Surlyn 9320 $X_5$ | 80 | 80 | 80 | — | 80 | — |
| Thermolan TT576B $X_6$ | — | — | — | 100 | — | 100 |
| SHP PA3060 $X_7$ | 10 | 20 | 40 | 20 | — | — |
| Titanium oxide | 4 | 4 | 4 | 6 | 4 | 6 |
| Slab hardness (Shore D) | 47 | 48 | 50 | 45 | 46 | 44 |

$X_4$ Hi-Milan 1605: Na neutralized ionomer of ethylene-methacrylic acid binary copolymer produced by Du Pont-Mitsui Polychemicals Co., Ltd.
$X_5$ Surlyn 9320: Zn neutralized ionomer of ternary copolymer of ethylene-methacrylic acid-butylacrylate produced by Du Pont
$X_6$ Thermolan TT576B: polyolefin thermoplastic elastomer produced by Mitsuibishi Chemical Corporation
$X_7$ SHP PA3060: Daiwa Polymer, EPDM/PP/nylon 6, short fiber reinforced ternary composite formed of ternary graft copolymer

TABLE 6

|  | Example | | | | Comparative Example | |
|---|---|---|---|---|---|---|
| G/B physical property | 7 | 8 | 9 | 10 | 4 | 5 |
| Core formulation | B | B | B | B | B | B |
| Core diameter (mm) | 40 | 40 | 40 | 40 | 40 | 40 |
| Cover formulation | 10 | 11 | 12 | 13 | 14 | 15 |
| Cover slab hardness (shore D) | 47 | 48 | 50 | 45 | 46 | 44 |
| Cover thickness (mm) | 1.4 | 1.4 | 1.4 | 1.4 | 1.4 | 1.4 |
| Deformation amount (mm) at 10–130 kg | 2.75 | 2.70 | 2.67 | 2.80 | 2.78 | 2.82 |
| Abrasion resistance | ○ | ○ | ○ | ○ | x | x |
| Wear resistance (index) | 25 | 10 | 5 | 5 | 80 | 100 |

Examples 7–9 are cover compositions produced by blending the ternary composite in the ionomer resin. Example 10 is a cover composition produced by blending the ternary composite in the polyolefin resin. Any of these golf balls is excellent in wear resistance and abrasion resistance. On the other hand, Comparative Examples 4 and 5 use a cover composition without the ternary composite blended and are inferior in wear resistance and abrasion resistance.

The golf ball in accordance with the present invention is produced by blending a ternary composite into a resin component of a cover composition, so that the resistance against wear and abrasion can be improved while the various characteristics such as rebound performance are not reduced. The ternary composite is mixed in at least one selected from the group consisting of a polyurethane resin, a polyester resin, a polyamide resin and a polyolefin resin, in particular, as a resin component. Therefore the resistance against wear and abrasion can be improved without impairing the various characteristics such as rebound performance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball comprising a core and an outermost cover covering the core,
wherein said cover comprises a resin composition of a ternary composite made of a rubber component, a polyolefin component and a nylon fiber component wherein said components are chemically bound together to form said ternary composite, said ternary composite admixed in a matrix of a resin component, and wherein the cover composition contains 1–50 parts by mass of the ternary composite in 100 parts by mass of the resin component.

2. The golf ball according to claim 1, wherein the relative amount of the polyolefin component is in the range of 40–100, and the relative amount of the nylon fiber component is in the range of 87–105, based on 100 parts by weight of the rubber component.

3. A golf ball comprising a core and an outermost cover covering the core,
wherein said cover comprises a resin composition of a ternary composite made of a rubber component, a polyolefin component and a nylon fiber component wherein said components are chemically bound together to form said ternary composite, said ternary composite admixed in a matrix of at least one resin component selected from the group consisting of a polyurethane resin, a polyester resin and a polyamide resin, and wherein the cover composition contains 1–50 parts by mass of the ternary composite in 100 parts by mass of the resin component.

4. The golf ball according to claim 3, where said resin component is a thermoplastic elastomer.

5. The golf ball according to claim 3, wherein the at least one resin component is selected from the group consisting of a polyurethane thermoplastic resin, a polyurethane thermoplastic elastomer, a polyester thermoplastic resin, a polyester thermoplastic elastomer, and a polyamide thermoplastic resin, and a polyamide thermoplastic elastomer.

6. The golf ball according to claim 3, wherein the rubber component is selected from the group consisting of natural rubber, polyisoprene, ethylene-propylene-diene rubber, nitrile-butadiene rubber, and hydrogenated nitrile-butadiene rubber.

7. The golf ball according to claim 3, wherein the polyolefin component is selected from the group consisting of low-density polyethylene, high-density polyethylene and polypropylene.

8. The golf ball according to claim 3, wherein the relative amount of the polyolefin component is in the range of 40–100, and the relative amount of the nylon fiber component is in the range of 87–105, based on 100 parts by weight of the rubber component.

9. A golf ball comprising a core and an outermost cover covering the core,
wherein said cover comprises a composition of a ternary composite made of a rubber component, a polyolefin component and a nylon fiber component wherein said components are chemically bound together to form said ternary composite, said ternary composite admixed in a matrix of an olefin resin.

10. The golf ball according to claim 9, wherein the olefin resin is an olefin thermoplastic resin, an ionomer resin, an olefin thermoplastic elastomer, or a modified product thereof.

11. The golf ball according to claim 9, wherein the cover a composition contains 1–50 parts by mass of said ternary composite in 100 parts by mass of the olefin resin.

12. The golf ball according to claim 11, wherein the relative amount of the polyolefin component is in the range of 40–100, and the relative amount of the nylon fiber component is in the range of 87–105, based on 100 parts by weight of the rubber component.

13. The golf ball according to claim 9, wherein the cover has a Shore D hardness of 40–56.

14. The golf ball according to claim 9, wherein the at least one resin component is selected from the group consisting of a polyurethane thermoplastic resin, a polyurethane thermoplastic elastomer, a polyester thermoplastic resin, a polyester thermoplastic elastomer, and a polyamide thermoplastic resin, and a polyamide thermoplastic elastomer.

15. The golf ball according to claim 9, wherein the rubber component is selected from the group consisting of natural rubber, polyisoprene, ethylene-propylene-diene rubber, nitrile-butadiene rubber, and hydrogenated nitrile-butadiene rubber.

16. The golf ball according to claim 9, wherein the polyolefin component is selected from the group consisting of low-density polyethylene, high-density polyethylene and polypropylene.

17. The golf ball according to claim 9, wherein the relative amount of the polyolefin component is in the range of 40–100, and the relative amount of the nylon fiber component is in the range of 87–105, based on 100 parts by weight of the rubber component.

* * * * *